June 17, 1969   R. C. BUELER   3,450,443
CONTROL VALVE

Filed Jan. 4, 1968

INVENTOR
RICHARD C. BUELER
BY
Joseph E Papin

FIG. 2

INVENTOR
RICHARD C. BUELER
BY
Joseph E. Papin.

United States Patent Office 3,450,443
Patented June 17, 1969

3,450,443
CONTROL VALVE
Richard C. Bueler, St. Louis, Mo., assignor to Wagner Electric Corporation, Newark, N.J., a corporation of Delaware
Filed Jan. 4, 1968, Ser. No. 695,773
Int. Cl. B60t 11/16, 13/10
U.S. Cl. 303—6   40 Claims

ABSTRACT OF THE DISCLOSURE

A split brake system having separate branches respectively connected with separate servo motors for braking in each of the front and rear brakes and with the separate fluid pressure generating chambers of a split system master cylinder, and a control valve for comparing the magnitudes of the fluid pressures in the separate branches and for proportioning the fluid pressure generated by the split master cylinder through said branches to selected ones of the servo motors in said branches.

---

This invention relates to split fluid pressure systems and in particular to control valves employed therein.

In the past, vertically split fluid pressure systems were employed connecting the front and rear axle sets of friction devices respectively with the separate fluid pressure generating chambers of a split master cylinder; however, such systems have the inherent disadvantageous or undesirable feature of erratic controllability upon the failure of one of the front and rear axle sets of friction devices. In order to overcome this disadvantageous feature, a horizontally split system was employed wherein each of the friction devices of the front and rear axle sets was provided with separate fluid pressure responsive motors or wheel cylinders for braking purposes, and one of said motors of each front and rear axle set of friction devices was connected in one system branch with one fluid pressure generating chamber of the split master cylinder while the other of said motors was connected in the other of the system branches with the other fluid pressure generating chamber of said split master cylinder; therefore, if the fluid pressure in one of the system branches failed, the motor connected in the other of the system branches was available to actuate each of the friction devices of the front and rear axle sets thereof. Since it is necessary to proportion the fluid pressure for actuating the rear axle set of friction devices, one of the disadvantageous features of the horizontally split system was that two proportioning valves were necessary, i.e., one in each system branch, and further, in order to insure proportioning in each of the separate system branches at substantially the same predetermined pressure, it was necessary to provide special adjusting mechanisms on each proportioning valve which was also an undesirable or disadvantageous feature. Another undesirable feature was that the proportioning valves continued to proportion, i.e., reduce, the fluid pressure to the motors in one branch system on the rear axle set of friction devices upon failure of the other branch system when, in fact, under these emergency conditions, it is manifest to attain the maximum available fluid pressure in all servo motors of the functioning branch system. And still another disadvantageous feature of such past integrated fluid pressure systems was that when a warning valve for indicating failure between the two system branches was employed, it was also a separate entity disassociated from the two proportioning valves which further complicated the system and increased the cost thereof.

The principal object of the present invention is to provide a horizontally split system, as well as a control valve for use therein, which obviates or overcomes the aforementioned disadvantageous or undesirable features, as well as others, and this and other objects and advantageous features of the present invention will become apparent hereinafter.

Briefly, one aspect of the invention includes a horizontally split fluid pressure system, as well as a control valve therefor, having a pair of members for proportioning separate fluid pressures supplied thereto through the split or separate branches of the horizontally split system to selected ones of the fluid pressure responsive motors thereof and operable against each other through a resilient connection to effect substantially the same predetermined fluid pressure in said branches at which proportioning begins; and another aspect of the invention includes indicating means in the control valve for comparing the magnitudes of the separate fluid pressures supplied to the pair of members, as well as the separate proportioned fluid pressures, said indicating means defining by-pass means in said control valve for by-passing the fluid pressure supplied to one of said members upon the failure of the fluid pressure supplied to the other of said members.

In the drawings which illustrate embodiments of the invention.

Figure 1:
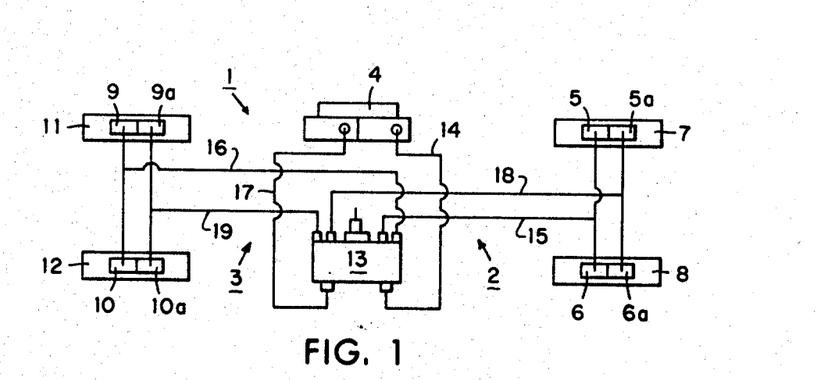
FIG. 1 is a schematic diagram of the brake system of the present invention.

Referring now to the drawings and in particular to FIG. 1, a horizontally split fluid pressure system 1 is shown schematically having separate branches 2, 3 connected between the separate fluid pressure generating chambers (not shown) of a tandem or split system type master cylinder 4 and between fluid pressure responsive motors or split wheel cylinders 5, 5a, 6, 6a of the front axle set of friction devices or brakes 7, 8 and fluid pressure responsive motors or split wheel cylinders 9, 9a, 10, 10a of the rear axle set of friction devices or brakes 11, 12, and a control valve 13 is interposed in said branches. In the branch 2, a conduit 14 is connected between one fluid pressure generating chamber of the split master cylinder 4 and an inlet port of the control valve 13, and conduits 15, 16 are respectively connected between separate outlet ports of said control valve and the split wheel cylinders 5, 6 of the front brakes 7, 8 and the split wheel cylinders 9, 10 of the rear brakes 11, 12. In the branch 3, a conduit 17 is connected between the other fluid pressure generating chamber of the split master cylinder 4 and another inlet port of the control valve 13, and conduits 18, 19 are respectively connected between other separate outlet ports of said control valve and the split wheel cylinders 5a, 6a of the front brakes 7, 8 and the split wheel cylinders 9a, 10a of the rear brakes 11, 12.

Figure 2:
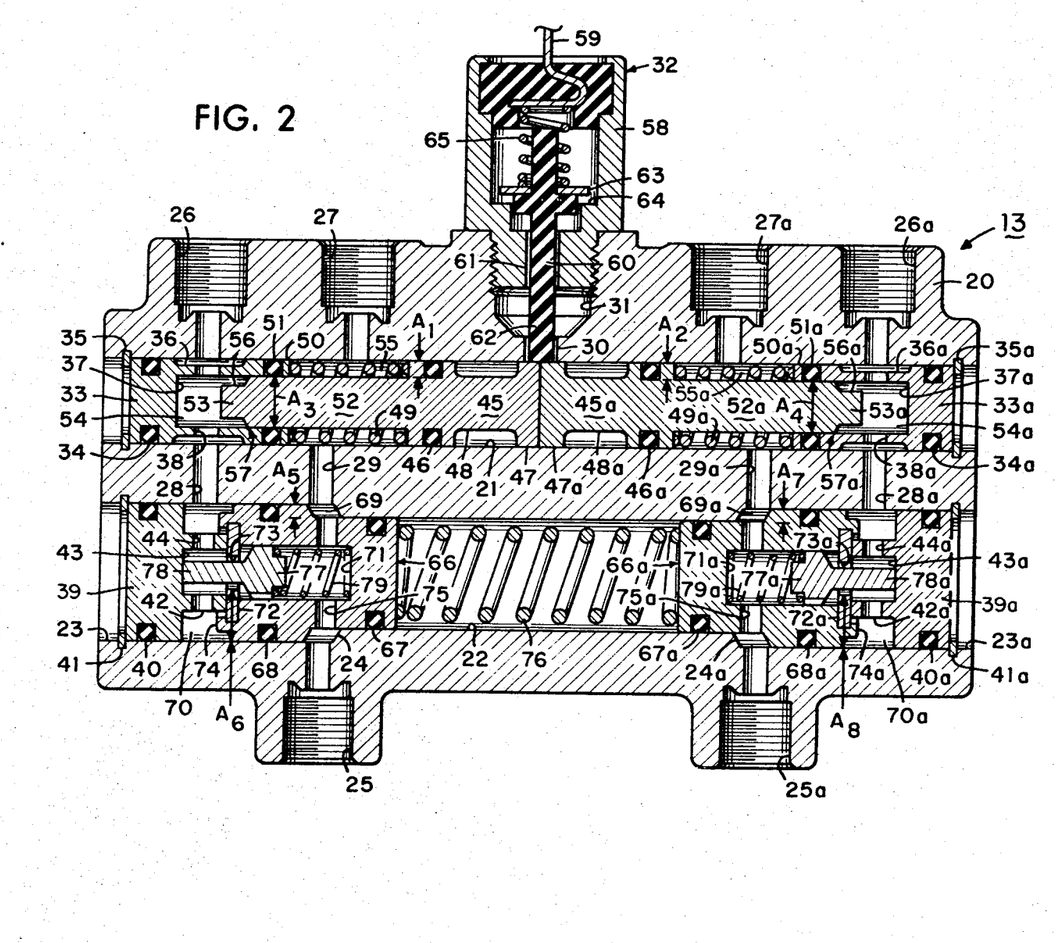
FIG. 2 is a sectional view showing a control valve also embodied in the present invention and for use in the system of FIG. 1 in cross-section.

Referring now to FIG. 2, the control valve 13 is provided with a housing 20 having upper and lower bores 21, 22 therein, and said lower bore is interposed between opposed counterbores 23, 23a having opposed shoulders 24, 24a therebetween. Inlet ports 25, 25a which receive conduits 17, 14, as previously mentioned, are provided in the housing 20 intersecting the counterbores 23, 23a adjacent to the shoulders 24, 24a. Outlet ports 26, 26a which receive conduits 19, 16, as previously mentioned, are provided in the housing 20 respectively intersecting the upper bore 21 adjacent to the opposed ends thereof, and other outlet ports 27, 27a which receive conduits 18, 15, as previously mentioned, are also provided in said housing intersecting said upper bore leftwardly and rightwardly, respectively, of the outlet ports 26, 26a. Vertical passages 28, 28a are provided in the housing 20 connected between the upper bore 21 and the counterbores 23, 23a adjacent their outer ends, respectively, and other vertical passages 29, 29a are also provided in said housing having one of their ends intersecting the counterbores 23, 23a adjacent to the shoulders 24, 24a and the other of their ends intersecting with the upper bore 21 inwardly of the passages 28, 28a. A cross-bore 30 is also provided in the housing 20 intersecting the upper bore 21 adjacent the mid-portion thereof and connecting with a cross-counterbore 31 which is threaded at its outer end to receive an electrical switch 32, to be discussed hereinafter.

Closure members or end plugs 33, 33a having peripheral seals 34, 34a are retained in the opposed ends of the housing bore 21 against displacement therefrom by snap ring and groove assemblies 35, 35a, said closure members having peripheral grooves 36, 36a between the opposed ends thereof which are respectively aligned with the outlet ports 26, 26a and the housing passages 28, 28a. Blind bores 37, 37a are provided through the free or interior ends of the closure members 33, 33a and a plurality of cross-passages 38, 38a are provided in said closure members between said blind bores and the peripheral grooves 36, 36a thereof. Other closure members or abutment end plugs 39, 39a having peripheral seals 40, 40a are obtained in the opposed ends of the housing counterbores 23, 23a against displacement therefrom by other snap ring and groove assemblies 41, 41a. The closure members 39, 39a are provided with extensions 42, 42a which protrude substantially coaxially into the housing counterbores 23, 23a, and blind bores 43, 43a are provided through the free ends of said extensions, said blind bores being intersected adjacent to their end walls by a plurality of cross-passages 44, 44a respectively provided through said extensions.

Opposed translatory switch actuating members or pistons 45, 45a having peripheral seals 46, 46a are slidably received in the upper bore 21 in abutting engagement between the outlet ports 27, 27a, and said pistons are provided with lands or positioning portions 47, 47a slidable in said upper bore and normally positioned beneath the housing cross-bore 30, as shown. Of course, while the pistons 45, 45a are disclosed as separate constructions, it is obvious that said pistons could be a unitary construction. Locking grooves 48, 48a are peripherally provided in the switch pistons 45, 45a between the land portions 47, 47a and the seals 46, 46a, and motion impeding or centering springs 49, 49a are interposed between the pistons 45, 45a and retainers 50, 50a to normally urge seals 51, 51a into sealing engagement with the interior or free end of the closure members 33, 33a and the housing upper bore 21. The pistons 45, 45a are provided with extensions 52, 52a which extend coaxially through the upper bore 21 having end portions 53, 53a slidable in the closure member bores 37, 37a. The end portions 53, 53a define with the closure member bores 37, 37a opposed fluid pressure chambers 54, 54a in open pressure fluid communication with the ports 26, 26a, and other opposed fluid pressure chambers 55, 55a are defined in the housing bore 21 between the switch pistons 45, 45a and the inward ends of the closure members 33, 33a in open pressure fluid communication with the ports 27, 27a, respectively. The peripheral portions of the extensions 52, 52a are normally sealably engaged with the seals 51, 51a, and said extension end portions 53, 53a are reduced at 56, 56a to define with the housing upper bore 21 and the closure member bores 37, 37a by-pass passages, indicated generally at 57, 57a, between the outlet ports 26, 27 and 26a, 27a upon actuation of said reduced portions through the seals 51, 51a, as will be discussed hereinafter.

It should be noted that opposed, substantially equal, effective annular areas $A_1$, $A_2$ are provided on the pistons 45, 45a, and respectively subjected to the fluid pressures at the outlet ports 27, 27a, and opposed substantially equal effective areas $A_3$, $A_4$ are also provided on the piston extension 52, 52a being substantially defined by the engagement thereof with the seals 51, 51a and respectively subjected to the fluid pressures at the outlet ports 26, 26a.

The electrical switch 32 includes a conductive closure or plug member 58 threadedly and conductively received in the open end of the housing cross-bore 31, and a metal terminal 59 extends through said plug member and is insulated therefrom, said terminal having an exterior end for connection in an electrical circuit of a type well known in the art for selectively energizing a driver warning or dash lamp (not shown). A non-conductive switch operating or follower member 60 is slidably received in a bore 61 provided in the plug member 58, said follower member having a lower end portion 62 extending through the housing cross-bore 30 into engagement with the switch piston lands 47, 47a, and a conductive contact 63 is provided adjacent to the upper end of said follower member for electrical engagement with another contact 64 on said plug member. A current carrying spring 65 is interposed between the interior end of the terminal 59 and the switch member contact 63 urging said switch member follower end into positioning engagement with the piston lands 47, 47a and urging said switch member contact 63 toward the plug member contact 64.

Opposed control or proportioning members, such as stepped metering pistons, indicated generally at 66, 66a, are slidably received in the opposed ends of the housing bore 22 and the counterbores 23, 23a, said proportioning pistons having peripheral seals 67, 67a and 68, 68a in sealing engagement with said housing bore and said counterbores, respectively. The proportioning pistons 66, 66a define fluid pressure chambers 69, 69a in the bore 21 and opposed counterbores 23, 23a between the seals 67, 67a and 68, 68a and said chambers 69, 69a are connected in open pressure fluid communication with the inlet ports 25, 25a and housing passages 29, 29a. Opposed fluid pressure chambers 70, 70a are also defined in the housing counterbores 23, 23a between the closure members 39, 39a and the seals 68, 68a of the proportioning pistons 66, 66a, and said chambers 70, 70a are connected in open pressure fluid communication with the housing passages 28, 28a. Blind stepped bores 71, 71a are provided in the proportioning pistons 66, 66a, and valve seats 72, 72a having central passages 73, 73a therethrough are fixedly received in engagement with the shoulder defined between the proportioning piston stepped bores 71, 71a by suitable means, such as staking, at 74, 74a. A plurality of cross-passages 75, 75a are provided in the proportioning pistons 66, 66a between the seals 67, 67a and 68, 68a having one of their ends intersecting with the proportioning piston smaller stepped bores 71, 71a adjacent the end walls thereof and the other of their ends in open pressure fluid communication with the inlet ports 25, 25a and the housing connecting passages 29, 29a. A metering or proportioning spring 76 is provided in the lower housing bore 22 biased between the inward opposed ends of the proportioning pistons 66, 66a and urging said pistons outwardly to engage their outward opposed ends or the valve seats 72, 72a with the free end of the closure member extensions 42, 42a, and valve members 77, 77a are slidably and guidably received in the proportioning piston smaller stepped bores 71, 71a having a stem portion 78, 78a extending coaxially through the valve seat passages 73, 73a into the closure member bores 43, 43a. Valve springs 79, 79a are interposed between the end walls of the proportioning piston smaller stepped bores 71, 71a and the valve members 77, 77a urging the free end of the valve member stem portions 78, 78a into abutting engagement with the end walls of the closure member bores 43, 43a and thereby spacing the valve members 77, 77a from the valve seats 72, 72a to normally establish pressure fluid communication between the inlet ports 25, 25a and the outlet ports 26, 26a.

It should be noted that the proportioning pistons 66, 66a are provided with opposed differential areas $A_5$, $A_8$ and $A_7$, $A_8$ subjected to fluid pressure at the inlet and outlet ports 25, 26 and 25a, 26a, respectively, and the areas $A_6$ and $A_8$ are substantially equal and predeterminately greater than the areas $A_5$ and $A_7$ which are also substantially equal. To complete the description of the control valve 13, the areas $A_5$ and $A_7$ are defined as the differences between the cross-sectional sealing areas of the seals 68, 68a with the housing counterbores 23, 23a and the seals 67, 67a with the housing lower bore 22, and the areas $A_6$ and $A_8$ are defined as the annular area between the valve seat passages 73, 73a and the counterbores 23, 23a.

Figure 3:
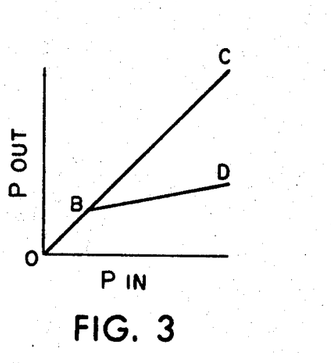
FIG. 3 is a graphical representation of the input and output fluid pressures for the control valve of FIG. 2.

In the operation with the component parts of the system 1 and control valve 13 positioned as shown in FIGS. 1 and 2, an operator applied force on the split master cylinder 4 establishes separate fluid pressures $P_1$, $P_2$ in the primary and secondary fluid pressure generating portions or chambers thereof (not shown), and for the sake of simplicity, the established fluid pressures $P_1$, $P_2$ are defined as being substantially equal in magnitude. The fluid pressures $P_1$, $P_2$ are respectively transmitted or supplied through conduits 17, 14 to the inlet ports 25, 25a of the control valve 13 flowing therefrom through the chambers 69, 69a, the housing passages 29, 29a and the chambers 55, 55a to the outlet ports 27, 27a. From the outlet ports 27, 27a the fluid pressures $P_1$, $P_2$ are respectively transmitted through conduits 18, 15 to servo motors 5a, 6a and 5, 6 of the front brakes 7, 8 to effect energization thereof. At the same time, the fluid pressures $P_1$, $P_2$ also are respectively transmitted from the housing chambers 69, 69a through the cross-passages 75, 75a, the stepped bores 71, 71a, and the valve seat passage 73, 73a of the proportioning pistons 66, 66a into the chambers 70, 70a and therefrom through the housing passages 28, 28a and chambers 54, 54a to the outlet ports 26, 26a. From the outlet ports 26, 26a the fluid pressures $P_1$, $P_2$ are transmitted through conduits 19, 16 to servo motors 9a, 10a and 9, 10 of the rear brakes 11, 12 to also effect energization thereof. This portion of the braking application is illustrated in the graph of FIG. 3 along the line OB wherein the magnitudes of the fluid pressures $P_1$, $P_2$ at their respective inlet ports 25, 25a and outlets ports 26, 27 and 26a, 27a are substantially equal or in a substantially 1:1 ratio and less than the predetermined value B. Since the fluid pressures $P_1$, $P_2$ are substantially equal throughout the system 1 until they attain the predetermined value B, the fluid pressure $P_1$ in housing chambers 55, 54 acts on the areas $A_1$, $A_3$ of the switch piston 45 therein establishing additive forces $P_1A_1$, $P_1A_3$ which are substantially equal and opposite to additive forces $P_2A_2$, $P_2A_4$ established by the fluid pressure $P_2$ in the housing chambers 55a, 54a acting on the areas $A_2$, $A_3$ of the switch piston 45a therein; therefore, the switch pistons 45, 45a will remain in their centered position, as shown in FIG. 2, so long as the opposing forces $P_1A_1$, $P_1A_3$ and $P_2A_2$, $P_2A_4$ acting thereon are substantially balanced or equal.

When the magnitudes of the fluid pressures $P_1$, $P_2$ are increased to the predetermined value B on the line OBC in the graph of FIG. 3, the fluid pressures $P_1$, $P_2$ in the housing chambers 69, 69a and 70, 70a acting on the opposed effective differential areas $A_5$, $A_6$ and $A_7$, $A_8$ of the proportioning pistons 66, 66a establish opposed differential forces $P_1A_5$, $P_1A_6$ and $P_2A_7$ which respectively move said proportioning pistons 66, 66a rightwardly and leftwardly against the compressive force Fc of the spring 76 toward isolating positions engaging the valve seats 72, 72a with the valves 77, 77a and disengaging the valve stems 78, 78a from abutment with the closure members 39, 39a. With the proportioning pistons 66, 66a in their isolated positions and the valves 77, 77a closed, the fluid pressures $P_1$, $P_2$ in the housing chambers 69, 69a are isolated from the fluid pressures $P_1$, $P_2$ in the housing chambers 70, 70a, and for the sake of clarity, the isolated fluid pressures $P_1$, $P_2$ in the housing chambers 70, 70a will hereinafter be referred to as isolated or ratioed fluid pressures $P_{1R}$, $P_{2R}$ so long as they remain isolated. In other words, when the fluid pressures $P_1$, $P_2$ attain the predetermined value B, the force $P_1A_5$ acting on the proportioning piston 66 assisted by the compressive force Fc of the spring 76 is overcome by the opposing force $P_{1R}A_6$ established by the isolated fluid pressure $P_{1R}$ acting on the area $A_6$ of said proportioning piston in the chamber 70 to maintain said proportioning piston in its isolating position, and the force $P_2A_7$ on the proportioning piston 66a assisted by the compressive force Fc of the spring 76 is overcome by the opposing force $P_{2R}A_8$ established by the isolated fluid pressure $P_{2R}$ acting on the area $A_8$ of the proportioning piston 66a in the chamber 70a to maintain said proportioning piston 66a in its isolating position. Since the proportioning pistons 66, 66a are each moving against the common compressive force Fc of the spring 76, the isolated fluid pressures $P_{1R}$, $P_{2R}$ will be substantially equal for all values thereof in excess of the predetermined value B as shown on the line BD in the graph of FIG. 3; therefore, the isolated fluid pressures $P_{1R}$, $P_{2R}$ acting on the areas $A_3$, $A_4$ of the switch pistons 45, 45a in the housing chambers 54, 54a establish substantially equal and opposite forces $P_{1R}A_3$, $P_{2R}A_4$ which are respectively additive to the substantially equal and opposite forces $P_1A_1$, $P_2A_3$. Hence, the switch pistons 45, 45a will remain in their centered positions so long as the additive forces $P_1A_1$, $P_{2R}A_3$ are substantially balanced by or equal to the additive forces $P_2A_2$, $P_{2R}A_4$. It is also apparent that the common compressive force Fc of the spring 67 can be preselected to determine the predetermined value B, the "knee" point of the line OBD.

When the fluid pressures $P_1$, $P_2$ are increased along the line OBC in the graph of FIG. 3 to a value predeterminately greater than the predetermined value B, the forces $P_1A_5$, $P_2A_7$ acting on the proportioning pistons 66, 66a are correspondingly increased and assisted by the compressive force Fc of the spring 76 to move said proportioning pistons leftwardly and rightwardly against the opposing force $P_{1R}A_6$, $P_{2R}A_8$ toward their respective metering or proportioning positions initially re-engaging the valve stems 78, 78a with the closure members 39, 39a and thereafter disengaging the valve seats 72, 72a from the valves 77, 77a to establish metered or proportioning pressure fluid communication between the housing chambers 69, 70 and 69a, 70a. In this manner, the increased fluid pressures $P_1$, $P_2$ are metered from the housing chambers 69, 69a through the proportioning piston cross-passages 75, 75a and bores 71, 71a and the apertures 73, 73a of the valve seats 72, 72a into the housing chambers 70, 70a to effect a metered proportional increase in the fluid pressures $P_{1R}$, $P_{2R}$. When the magnitudes of the fluid pressures $P_{1R}$, $P_{2R}$ are proportionally increased to values wherein the forces $P_{1R}A_6$ and $P_{2R}A_8$ are again overcome the respective opposing forces $P_1A_5$ and $P_2A_7$ assisted by the common compressive force Fc of the spring 76, the proportioning pistons 66, 66a are again moved rightwardly and leftwardly against said spring to their respective isolating positions re-engaging the valve seats 72, 72a with the valve elements 77, 77a and disengaging the valve stems 78, 78a from the closure members 39, 39a to again interrupt pressure fluid communication between the housing chambers 69, 70 and 69a, 70a isolating the fluid pressures $P_1$, $P_2$ from the isolated fluid pressures $P_{1R}$, $P_{2R}$, respectively. It should be noticed that the magnitudes of the isolated fluid pressures $P_{1R}$, $P_{2R}$ in excess of the predetermined value B are proportionally less than the magnitudes of the fluid pressures $P_1$, $P_2$ in excess of the predetermined value B; therefore, the intensity of the braking application of the rear brakes 11, 12 is proportionally less than or in a predetermined inverse ratio with the intensity of the braking application of the front brakes 7, 8 when the fluid pressures $P_1$, $P_2$ and the isolated fluid pressures $P_{1R}$, $P_{2R}$ exceed the predetermined value B. As mentioned hereinbefore, the switch pistons 45, 45a will remain in their centered positions since the increased values of $P_1$, $P_2$ above the predetermined value B are substantially equal acting on the substantially equal and opposed areas $A_1$, $A_2$ of said switch pistons 45, 45a and the increased values of the isolated fluid pressures $P_{1R}$, $P_{2R}$ in excess of the predetermined value B are also substantially equal acting on the substantially equal and opposed areas $A_3$, $A_4$ of said switch pistons 45, 45a, respectively. Of course, the component parts of the control valve 13 are responsive to further increases in the fluid pressures $P_1$, $P_2$ in excess of the predetermined value B to effect further metered increases in the isolated fluid pressures $P_{1R}$, $P_{2R}$ in excess of the predetermined value B for increasing the intensity of the braking application in the same manner as described hereinabove.

When the desired intensity of the braking application has been attained or a complete stop effected, the operator applied force is removed from the split master cylinder 4 to eliminate the established fluid pressures $P_1$, $P_2$ and permit the return flow of the displaced pressure fluid. Upon the elimination of the fluid pressures $P_1$, $P_2$, the displaced pressure fluid returns from the motors 5, 6 and 5a, 6a through conduits 18, 15, the outlet ports 27, 27a of the control valve 13, the housing chambers 55, 55a, the housing passages 29, 29a, and chambers 69, 69a to the inlet ports 25, 25a and therefrom through conduits 17, 14 to the split master cylinder 4. Of course, the elimination of the fluid presures $P_1$, $P_2$ eliminates the opposed and substantially equal forces $P_1A_1$, $P_2A_2$ acting on the switch pistons 45, 45a and also eliminates the forces $P_1A_5$, $P_2A_7$ acting on the proportioning pistons 66, 66a. It should be noted that when the proportioning pistons 66, 66a are in their isolating positions, fluid pressures $P_1$, $P_2$ act on the effective areas of the valves 77, 77a to maintain said valves engaged with their valve seats 72, 72a against the forces of the isolated fluid pressures $P_{1R}$, $P_{2R}$, which are proportionally less than the fluid pressures $P_1$, $P_2$ acting on the same effective area of the valves. Therefore, upon the elimination of the fluid pressures $P_1$, $P_2$, the isolated fluid pressures $P_{1R}$, $P_{R2}$ act on the effective areas of the valves 77, 77a to move said valves against their return springs 79, 79a toward a position disengaged from the valve seats 72, 72a establishing open pressure fluid communication between the housing chambers 69, 70 and 69a, 70a. In this manner, the isolated fluid pressures $P_{1R}$, $P_{2R}$ are eliminated, and the displaced pressure fluid also returns from the motors 9a, 10a and 9, 10 through conduits 19, 16, outlet ports 26, 26a of the control valve 13, the housing chambers 54, 54a, the housing passages 28, 28a, the housing chambers 70, 70a, the apertures 73, 73a of the proportioning piston valve seats 72, 72a, the bores and cross-bores 71, 71a and 75, 75a of the proportioning pistons 66, 66a to the housing chambers 69, 69a and therefrom through the conduits 17, 14 to the split master cylinder 4. Of course, the elimination of the isolated fluid pressures $P_{1R}$, $P_{2R}$ eliminates the opposed and substantially equal forces $P_{1R}A_3$, $P_{2R}A_4$ acting on the switch pistons 45, 45a and also eliminates the forces $P_{1R}A_6$, $P_{2R}A_8$ acting on the proportioning pistons 66, 66a. Upon the elimination of the forces $P_{1R}A_6$, $P_{2R}A_8$ acting on the proportioning pistons 66, 66a, the common compressive force Fc of the spring 76 moves said proportioning pistons leftwardly and rightwardly toward their normal positions in abutting engagement with the housing extensions 42, 42a disengaging the valve seats 72, 72a from the valves 77, 77a and re-engaging the valve stems 78, 78a with the closure members 39, 39a. In this manner, the elimination of the fluid pressures $P_1$, $P_2$ from the motors 5, 6 and 5a, 6a and the substantially simultaneous elimination of the isolated fluid pressures $P_{1R}$, $P_{2R}$ from the motors 9a, 10a and 9, 10 effects the substantially simultaneous de-energization of the front and rear brake assemblies 7, 8 and 11, 12.

In the event of the occurrence of an emergency condition, such as the failure of one of the fluid pressures $P_1$, $P_2$ in one of the system brances 2, 3 due to the malfunction of the fluid pressure generating portion (not shown) of the split master cylinder 4 connected with the failed system branch or other leaks or the like in such failed system branch, it is of course, manifest to obviate the proportioning or metering function of the one of the proportioning pistons 66, 66a in the other or functioning system branches 2, 3 which has its fluid pressure integrity preserved in order to subject the servo motors connected in the functioning system branch to the maximum fluid pressure available therein for effecting emergency energization of the front and rear brakes 7, 8 and 11, 12 under such emergency conditions. For instance, when the fluid pressures $P_1$, $P_2$ and $P_{1R}$, $P_{2R}$ are in excess of the predetermined value B and the proportioning pistons 66, 66a are in their isolating positions, as described hereinbefore, assume that the fluid pressure $P_2$ in the system branch 2 fails; therefore, it follows that the servo motors 5, 6 of the front brakes 7, 8 are de-actuated or unavailable to effect normal energization of said front brakes and the forces $P_2A_2$, $P_2A_7$ acting on the switch and proportioning pistons 45a, 66a, respectively, are eliminated. At the same time, the isolated fluid pressure $P_{2R}$ acts on the effective area of the valve 77a in the proportioning piston 66a to move said valve against its return spring 79a to a position disengaged from its valve seat 72a opening the aperture 73a and establishing open pressure fluid communication between the housing chambers 69a, 70a; therefore, since the failure of the fluid pressure $P_2$ as been assumed, it is obvious that the isolated fluid pressure $P_{2R}$ is also eliminated upon the connection of the housing chambers 69a, 70a in open pressure fluid communication. Upon the elimination of the isolated fluid pressure $P_{2R}$, the servo motors 9, 10 of the rear brakes 11, 12 are also de-actuated or unavailable to effect energization of said rear brakes. Further, the failure or elimination of the isolated fluid pressure $P_{2R}$ also eliminates the forces $P_{2R}A_4$ and $P_{2R}A_8$ acting on the switch and proportioning pistons 45a, 66a, and upon elimination of the force $P_{2R}A_8$, the compressive force Fc of the spring 76 moves said proportioning piston to its normal operating position into engagement with the housing extension 42a disengaging the valve seat 72a from the valve 77a and re-engaging the valve stem 78a with the closure member 39a.

When the forces $P_2A_2$ and $P_{2R}A_4$ acting on the switch piston 45a are eliminated, as described hereinabove, the opposing forces $P_1A_1$ and $P_{1R}A_3$ acting on the switch piston 45 are effective to concertedly displace or effect translatory movement of the switch pistons 45, 45a against the switch piston return spring 49a rightwardly in the housing bore 21 toward rightward displaced or translated positions defined by the engagement of the reduced end portion 53a of the switch piston 45a with the end wall of the blind bore 37a in the closure member 33a. This concerted rightward translatory movement of the switch pistons 45, 45a disengages the peripheral portion of the switch piston extension 52 from the seal 51 moving the reduced end portion 53 of said switch piston extension through said seal to a position opening the by-pass passages 57 between the housing chambers 54, 55 connecting said chambers in by-pass relation or open pressure fluid communication. When the by-pass passage 57 is opened, the magnitude of the isolated fluid pressure $P_{1R}$ is, of course, increased to equal that of the fluid pressure $P_1$, and the metering or proportioning function of the proportioning piston 66a is thereafter obviated. In this manner, the displaced pressure fluid in the system branch 3 is by-passed around the proportioning piston 66 wherein the fluid pressure $P_1$ now flows from the housing chamber 69 through the housing passage 29 into the housing chamber 55 and therefrom through the by-pass passage 57, the chamber 54, the outlet port 26 and the conduit 19 to the servo motors 9a, 10a to effect emergency energization of the rear brakes 11, 12 at the maximum fluid pressure available in the system branch 3 which is the magnitude of the fluid pressure $P_1$ also effecting emergency energization of the front brakes 7, 8.

The concerted rightward translatory movement of the switch pistons 45, 45a into their rightward displaced or translated positions also moves the switch piston lands 47, 47a rightwardly toward positions disengaging said lands from the follower end 62 of the switch follower member 60 and placing the locking groove 48 beneath the housing cross-bore 30. The force of the switch spring 65 thereafter drives the follower member 60 radially or downwardly moving the follower end 62 thereof into the housing bore 21 and into locking engagement with the side wall of the locking groove 48 in order to prevent the return of the switch pistons 45, 45a to their centered positions in response to the force of the return spring 49a acting thereon, and the downward movement of said follower member also engages the contact 63 thereon with the switch contact 64 thereby energizing the switch 32 to complete its electrical circuit and light a dash lamp (not shown) for warning the vehicle operator that a portion of his fluid pressure system 1 has failed. When the defect in the system 1 has been repaired, the switch 32 may be manually removed or threadedly disengaged from the housing cross-counterbore 31 to remove the follower end 62 of the follower member 60 from locking engagement with the switch piston locking groove 48, and the compressive force of the switch piston return spring 49a will return the switch pistons to their centered positions, as shown, with the extension 52 of the switch piston 45 sealably re-engaged with the seal 51 between the housing chambers 54, 55 closing the by-pass passage 57, wherein the switch may then be manually replaced in its original position.

In the event an oppositely directed differential is established between the fluid pressures $P_1$, $P_2$ due to a malfunction of the split master cylinder 4 or other leaks or the like in the system branch 3 wherein the magnitude of the supplied fluid pressure $P_2$ exceeds that of the supplied fluid pressure $P_1$ by a predetermined value or, for the sake of simplicity, wherein the fluid pressure $P_1$ fails completely, it follows that the force $P_1A_5$ acting on the proportioning piston 66 is eliminated permitting the isolated fluid pressure $P_{1R}$ acting on the effective area of the valve 77 to move said valve against its return spring 79 to a position disengaged from its valve seat 72 and establishing open pressure fluid communication through the valve seat aperture 73 between the housing chambers 69, 70. Since the fluid pressure $P_1$ has failed, this open pressure fluid communication between the housing chambers also reduces or eliminates the isolated fluid pressure $P_{1R}$, as well as the force $P_{1R}A_6$, so that the compressive force Fc of the spring 76 is effective to drive the proportioning piston 66 to its normal position in abutment with the housing extension 42 to initially engage the valve stem 78 with the closure member 39 and thereafter disengage the valve seat 72 from the valve 77.

With the fluid pressures $P_1$, $P_{1R}$ so eliminated, it is obvious that the forces $P_1A_1$ and $P_{1R}A_3$ acting on the switch piston 45 are also eliminated; therefore, the forces $P_2A_2$, $P_{2R}A_4$ acting on the switch piston 45a are effective to concertedly displace or effect translatory movement of the switch pistons 45, 45a against the switch piston return spring 49 leftwardly in the housing bore 21 toward leftward displaced or translated positions defined by the engagement of the reduced end portion 53 of the switch piston 45 with the end wall of the blind bore 37 in the closure member 33. This concerted leftward translatory movement of the switch pistons 45, 45a disengages the peripheral portion of the switch piston extension 52a from the seal 51a moving the reduced end portion 53a of said switch piston extension through said seal to a position opening the by-pass passage 57a between the housing chambers 54a, 55a connecting said chambers in by-pass relation or open pressure fluid communication. When the by-pass passage 57a is opened, the magnitude of the isolated fluid pressure $P_{2R}$ is, of course, increased to equal that of the fluid pressure $P_2$, and the metering or proportioning function of the proportioning piston 66a is thereafter obviated. In this manner, the displaced pressure fluid in the system branch 2 is by-passed around the proportioning piston 66a wherein the fluid pressure $P_2$ now flows from the housing chamber 69a through the housing passage 29a into the housing chamber 55a and therefrom through the by-pass passage 57a, the chamber 54a, the outlet port 26a and the conduit 16 to the servo motors 9, 10 to effect emergency energization of the rear brakes 11, 12 at the maximum fluid pressure available in the system branch 2 which is the magnitude of the fluid pressure $P_2$ also effecting emergency energization of the front brakes 7, 8. In the leftward displaced positions of the switch pistons 45, 45a, the switch 32 will function as described hereinbefore, to lockingly engage the follower end 62 of the follower member 60 with the locking groove 48a and engage the contacts 63, 64 to complete the circuit and light the driver warning dash lamp.

Figure 4:
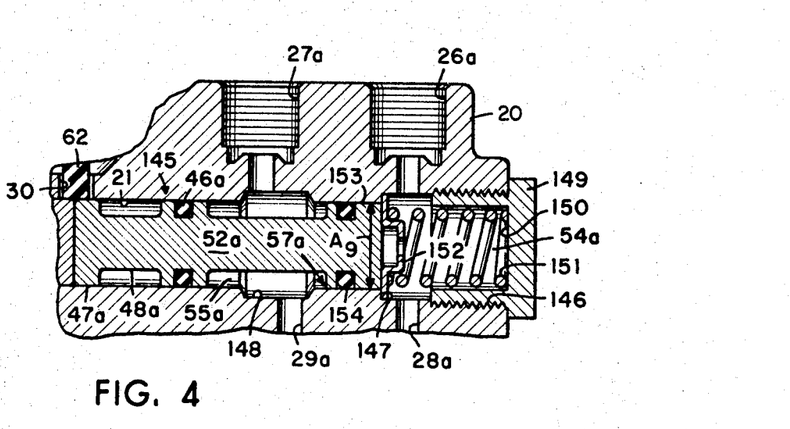
FIG. 4 is a partial sectional view of the control valve of FIG. 2 showing an alternate construction for the indicating means and by-pass feature thereof.

Referring now to FIG. 4, an alternative construction is shown for the switch pistons 45, 45a of the control valve 13 having substantially the same component parts and functioning in substantially the same manner as those previously described with the following exceptions; however, for the sake of simplicity, only one of the alternative switch pistons 145 is shown. A counterbore 146 is provided in the housing 20 in axial alignment with the housing bore 21, and an annular shoulder 147 is defined therebetween. The outlet port 26a and housing passage 28a connect with the counterbore 146 rightwardly of the shoulder 147, and an annular groove or undercut 148 is provided in the housing bore 21, leftwardly of the shoulder 147 connecting with the outlet port 27a and the housing passage 29a. A closure member 149 having a blind bore or recess 150 therein is threadedly received in the open end of the counterbore 146, and a centering or return spring 151 is engaged between said closure member and a perforated retainer 152 urging said retainer into abutment with the housing shoulder 147.

The extension 52a of the switch piston 145 is provided with an annular flange 153 on the free end thereof which is normally slidable in the housing bore 21 between the undercut 148 and the housing shoulder 147, and a peripheral seal 154 is carried in the flange 153 in sealing engagement with the portion of the housing bore 21 between the undercut 148 and the housing shoulder 147. It should be noted that the portion of the housing bore 21 between the undercut 148 and the housing shoulder 147 defines the by-pass passage 57a. The effective areas on the switch piston 145 between the seals 46a, 154 are balanced or self-cancelling and unaffected by the pressure $P_2$ in the housing chamber 55a; however, said switch piston 145 is provided with an effective area $A_9$ defined by the cross-sectional sealing area of the seal 154 and responsive to fluid pressure in the housing chamber 54a or counterbore 146. In the operation of the switch piston 145, it is apparent that upon the failure of the fluid pressures $P_1$ and $P_{1R}$, the isolated fluid pressure $P_{2R}$ in the counterbore 146 acts on the effective area $A_9$ of said switch piston establishing a force $P_{2R}A_9$ to displace or effect translatory movement of said switch piston leftwardly toward its leftward translated position. This leftward translatory movement of the switch piston 145 also moves the flange 153 leftwardly into the undercut 148 disengaging the seal 154 from the portion of the housing bore 21 between said undercut and the housing shoulder 147 thereby opening the by-pass passage 57a to obviate the metering or proportioning function of the proportioning piston 66a, as previously described. Of course, such translatory movement of the switch piston 145 to its leftward displaced position effects actuation of the switch 32, as previously described.

From the foregoing, it is now apparent that a novel system 1 and control valve 13 meeting the objects and advantageous features set out hereinbefore are provided and that changes or modifications as to the precise connections, shapes or details of the constructions and operations thereof set forth in the disclosure by way of illustration may be made by those skilled in the art without departing from the spirit of the invention.

The embodiments of the invention in which an exclusive property or privilege is claimed are defined as follows:

1. A fluid pressure system comprising a pair of sets of fluid pressure responsive motors, dual fluid pressure generating means for supplying separate fluid pressures to said motor sets, respectively, a pair of metering means respectively movable in response to the supplied fluid pressures in excess of a predetermined value for altering the magnitude of the separate fluid pressures supplied to one of the motors of said motor sets, and other means for comparing the magnitudes of the separate fluid pressures supplied to said motor sets including means defining by-pass means between said one motor and the other of said motors of each motor set, respectively, said other means being responsive to the failure of one of the separate fluid pressures supplied to one of said motor sets for by-passing the other separate fluid pressure supplied to said other motor of the other of said motor sets through one of said by-pass means directly to said one motor of said other motor set obviating the altering affect of one of said metering means on the other separate fluid pressure.

2. A fluid pressure system comprising first and second friction devices, first and second motors on each of said first and second friction devices for effecting energization thereof, means for supplying separate fluid pressures to said first motors of said first and second friction devices and to said second motors of said first and second friction devices, respectively, first and second proportioning means respectively responsive to the separate fluid pressures to proportionally reduce the magnitudes thereof supplied to said first motor of said first friction device and to said second motor of said second friction device, and movable means for comparing the magnitudes of the separate fluid pressures including opposed first and second portions respectively subjected to the magnitudes of the separate fluid pressures supplied to said first and second motors of said first and second friction devices, and first and second other means respectively defining first and second by-pass passage means between said first motors of said first and second friction devices and between said second motors of said first and second friction devices, said movable means being movable in response to the magnitude of one of the separate fluid pressures acting on one of said first and second opposed portions upon the failure of the other of the separate fluid pressures acting on the other of said first and second opposed portions toward a position by-passing the one separate fluid pressure through one of said first and second by-pass passage means to establish open pressure fluid communication between one of said first motors and said second motors of said first and second friction devices and obviate the altering affect of one of said proportioning means on the one separate fluid pressure.

3. A fluid pressure system comprising a pair of sets of fluid pressure responsive motors, means having a pair of fluid pressure generating chambers and operable to generate separate fluid pressures in said chambers, a pair of system branches connected between one of said chambers and one of the motors of one and the other of said motor sets and between the other of said chambers and another of the motors of said one and other motor sets, respectively, a pair of metering means in said system branches movable in response to the separate fluid pressures for altering the magnitudes thereof applied through said system branches to said one and other motors of said one motor set, respectively, other means movable between said system branches for comparing the magnitudes of the separate fluid pressures therein including means defining a pair of by-pass means in said branch systems between said one motors and between said other motors of said one and other motor sets, respectively, said other means being movable in response to a predetermined fluid pressure differential between the magnitudes of the separate fluid pressures in said branch systems acting thereon toward a position by-passing one of the separate fluid pressures supplied to one of said one and other motors of one of said one and other motor sets through one of said by-pass means directly to the other of said one and other motors of said one of said one and other motor sets and obviating the altering affect of one of said metering means on said one separate fluid pressure.

4. A fluid pressure system comprising first and second friction devices for separate vehicle axles, first and second motors on said first friction device and third and fourth motors on said second friction device to effect energization thereof, means including first and second fluid pressure generating chambers for supplying separate fluid pressures, first and second system branches connected between said first chamber and said first and third motors and between said second chamber and said second and fourth motors, respectively, first and second proportioning valve means connected in said first and second systems between said first and second chambers and said first and third motors and movable in response to the separate fluid pressures acting thereon toward positions reducing the magnitudes of the separate fluid pressures supplied to said first and third motors, respectively, and control means connected between said first and second branches for comparing the magnitudes of the separate fluid pressures including means movable from a normally centered position toward opposed translated positions and defining normally closed first and second by-pass passage means between said first and second motors and between third and fourth motors when in its centered position, and first and second opposed portions on said included means respectively subjected to one of the separate fluid pressures supplied to said second motor and the reduced one separate fluid pressure supplied to said first motor and to the other of the separate fluid pressures supplied to said fourth motor and the reduced other separate fluid pressure supplied to said third motor, said included means being movable from its centered position toward one of its translated positions to open one of said first and second by-pass passage means establishing open pressure fluid communication between one of said first and second motors and said third and fourth motors and obviating actuation of one of said first and second proportioning valve means upon a predetermined differential between the magnitudes of the one and other separate fluid pressures acting on said first and second opposed portions.

5. A fluid pressure system comprising a pair of axle sets of friction devices, a pair of fluid pressure responsive motors for energizing each of said friction devices, a dual master cylinder for generating separate fluid pressures upon actuation thereof, a pair of system branches connected between said dual master cylinder and one of the motors of one and the other of said friction device axle sets and between said dual master cylinder and the other of said motors of said one and other friction device axle sets, respectively, a pair of metering means in said system branches movable in response to the separate fluid pressures in excess of predetermined values for altering the magnitude of the separate fluid pressures applied therethrough to said one and other motors of said one friction device axle set, respectively, and other means for comparing the magnitudes of the separate fluid pressures in said system branches applied to said one and other motors of said one friction device axle set and to said one and other motors of said other friction device axle set including means defining a pair of by-pass means in said system branches between said one motors of said one and other friction device axle sets and between said other motors of said one and other friction device axle sets, respectively, said other means being responsive to the failure of one of the separate fluid pressures in one of said system branches to by-pass the other of the separate fluid pressures supplied to said other motors of said other friction device axle set through one of said by-pass means directly to said other motors of said one friction device axle set obviating the altering affect of one of said metering means in said other system branch on the other separate fluid pressure.

6. A fluid pressure system comprising a pair of axle sets of friction devices, a pair of fluid pressure responsive motors for energizing each of said friction devices, a dual master cylinder having a pair of fluid pressure generating chambers for supplying separate fluid pressures upon actuation thereof, a first system branch connected between one of said chambers and one of said motors of each friction device of one of said axle sets, a second system branch connected between said first branch and one of said motors of each friction device of the other of said axle sets, a third system branch connected between the other of said chambers and the other of said motors of each friction device of said one axle set, a fourth system branch connected between said third branch and the other of said motors of each friction device of said other axle set, a pair of proportioning valve means connected in said second and fourth branches and movable in response to the separate fluid pressures supplied thereto from said chambers to proportionally reduce the magnitudes of the separate fluid pressures applied to said one and other motors of each friction device of said one axle set, respectively, and control means connected between said first and second branches and said third and fourth branches for comparing the magnitudes of the separate fluid pressures therein including means movable from a normally centered position toward opposed translated positions and defining a pair of shunt passage means respectively connected between said first and second branches and between said third and fourth branches in by-pass relation with said proportioning valve means, said shunt passage means being normally closed when said included means is in its centered position, and first and second pairs of opposed portions on said included means respectively subjected to the separate fluid pressures in said first and second branches and said third and fourth branches, said included means being movable from its centered position toward one of its opposed translated positions to open one of said shunt passage means by-passing one of said proportioning valve means and obviating actuation thereof in response to the separate fluid pressure supplied thereto upon a predetermined differential between the magnitudes of the separate fluid pressures in said first and second branches and said third and fourth branches acting on said first and second pairs of opposed portions, respectively.

7. A fluid pressure system comprising a pair of axle sets of friction devices, a pair of fluid pressure responsive motors for energizing each of said friction devices of said pair of friction device axle sets, a dual master cylinder having a pair of fluid pressure chambers for supplying separate fluid pressures upon actuation, means for controlling the application of the separate fluid pressures between said chambers and said motors, a pair of input branches respectively connected between said chambers and said control means, a first pair of delivery branches respectively connected between said control means and one of the motors of one and the other of said friction device axle sets, and a second pair of delivery branches respectively connected between said control means and the other of said motors of said one and other friction device axle sets, said control means including a pair of sets of flow passages respectively connected between said input branches and said first and second pairs of delivery branches, a pair of proportioning valve means movable in one flow passage of one and the other of said flow passage sets in response to the separate fluid pressure to alter the magnitudes thereof applied through one delivery branch of each of said first and second pairs of delivery branches to said one motors of said one friction device axle set and to said other motors of said other friction device axle set, respectively, and other means for comparing the magnitudes of the separate fluid pressures including translatory means movable from a normally centered position toward opposed translated positions and defining a pair of shunt passage means respectively connected between said one flow passage and the other of said flow passages of said flow passage sets in by-pass relation with said proportioning valve means, said shunt passage means being normally closed when said translatory means is in its centered position, and first and second pairs of opposed effective areas on said translatory means respectively subjected to the separate fluid pressures in said one and other flow passages of said flow passage sets, said translatory means being movable from its centered position toward one of its opposed translated positions to open one of said shunt passage means by-passing one of said proportioning valve means and obviating actuation thereof in response to one of the supplied fluid pressures supplied thereto upon the occurrence of a predetermined differential between the magnitudes of the separate fluid pressures in said one and other flow passages of said flow passage sets acting on said first and second pairs of areas, respectively.

8. The fluid pressure system according to claim 7, comprising resilient means engaged between said proportioning valve means, said proportioning means being movable against said resilient means to effect substantially simultaneous alteration of the separate fluid pressures applied through said one flow passage of said flow passage sets.

9. The fluid pressure system according to claim 8, comprising third and fourth pairs of differential areas on said proportioning valve means, said proportioning valve means being movable against said resilient means in response to magnitudes of the separate fluid pressures supplied thereto of a predetermined value and acting on said third and fourth pairs of differential areas toward positions closing said one flow passages of said flow passage sets, and said proportioning means being thereafter further movable in response to magnitudes in excess of the predetermined value of the separate fluid pressures acting on one of the areas of said third and fourth differential area pairs and the compressive force of said resilient means toward a position effecting a metered increase in the fluid pressure applied therethrough acting on the other of the areas of said third and fourth differential area pairs in a predetermined ratio with that acting on said one areas of said third and fourth differential area pairs.

10. A control valve comprising a housing having a pair of sets of flow passages therein respectively subjected to separate fluid pressures, a pair of proportioning means respectively movable in said housing between the flow passages of each flow passage set and subjected to the separate fluid pressures therein, said proportioning means being movable in response to the separate fluid pressures in excess of a predetermined value in the flow passages of each flow passage set to effect increases in the magnitudes of the separate fluid pressures in one of the flow passages of each flow passage set in a predetermined ratio with increases in the magnitudes of the separate fluid pressures in the other of the flow passages of each flow passage set in excess of the predetermined value, and other means movable in said housing for comparing the magnitudes of the one separate fluid pressure in the one and other flow passages of one of said flow passage sets with the magnitudes of the other separate fluid pressure in the one and other flow passages of the other of said flow passage sets including a pair of means respectively defining with said housing a pair of passage means between the one and other flow passages of said one and other flow passage sets in by-pass relation with said proportioning means, said other means being responsive to one of the one and other separate fluid pressures in the one and other flow passages of one of said one and other flow passages sets to move one of said included means toward a position establishing pressure fluid communication between the one and other flow passages of said one of said one and other flow passage sets through one of said by-pass passage means by-passing one of said proportioning means to obviate actuation thereof upon the failure of the other of said one and other fluid pressures in the one and other flow passages of the other of said one and other flow passage sets.

11. The control valve according to claim 10, comprising a pair of opposed substantially equal areas on said other means respectively subjected to the separate fluid pressures in said other flow passages of each flow passage set, and another pair of opposed substantially equal areas on said included pair of means respectively subjected to the separate fluid pressures in said one flow passages of each flow passage set.

12. The control valve according to claim 10, wherein said included pair of means comprise a pair of opposed extensions on said other means extending through said other flow passages of each flow passage set and having end portions defining with said housing said one flow passages of each flow passage set, respectively.

13. The control valve according to claim 10, comprising a pair of sealing means on said included pair of means normally in sealing engagement with said pair of passage means to interrupt pressure fluid communication therethrough between said one and other flow passages of said one flow passage set and said one and other flow passages of said other flow passage set, respectively, one of said sealing means being movable toward a position disengaged from one of said passage means establishing pressure fluid communication therethrough between the one and other flow passages of said one of said one and other flow passage sets in response to the actuation of said other means upon the failure of said other of said one and other separate fluid pressures.

14. The control valve according to claim 10, wherein said included pair of means comprise a pair of opposed extensions on said other means extending through said other flow passages of each flow passage set and into said pair of passage means normally interrupting pressure fluid communication therethrough between said one and other flow passages of said one flow passage set and between said one and other flow passages of said other flow passage set, respectively, a pair of opposed areas on said other means respectively subjected to the separate fluid pressures in said other flow passage of said one and other flow passage sets, and another pair of opposed areas on said pair of extensions respectively subjected to the separate fluid pressures in said one flow passage of said one and other flow passage sets, respectively.

15. The control valve according to claim 10, comprising a pair of sealing means disposed in said pair of passage means for sealing engagement with said included pair of means to interrupt pressure fluid communication through said pair of passage means between said one and other flow passages of said one and other flow passage sets, and a pair of reduced portions on said included pair of means for movement through said pair of sealing means to open said pair of passage means and establish pressure fluid communication between said one and other flow passages of said one and other flow passage sets, respectively.

16. The control valve according to claim 10, wherein said other means includes piston means movable in said housing and having a pair of opposed end portions respectively defining with said housing said one flow passage of said pair of flow passage sets, and said included pair of means comprising a pair of opposed extensions connected with said pair of opposed end portions and extending through said one flow passage of said pair of flow passage sets, another pair of opposed end portions on said pair of extensions movable in said pair of passage means in sealing engagement therewith and normally interrupting pressure fluid communication through said pair of passage means between said one and other flow passages of said one and other flow passage sets, respectively, said first named pair of opposed end portions defining a pair of substantially equal opposed areas respectively subjected to the one and other separate fluid pressures in said one flow passage of said one and other flow passage sets, and said other pair of opposed end portions defining another pair of substantially equal opposed areas respectively subjected to the one and other separate fluid pressures in said other flow passages of said one and other flow passage sets, the one separate fluid pressure in said one and other flow passages of said one flow passage set acting on one of said first named pair of areas and one of said other pair of areas to move said piston means and said pair of extensions in a direction to sealably disengage one of said other opposed end portions from said one passage means establishing pressure fluid communication therethrough between said one and other flow passages of said one flow passage set up the failure of the other fluid pressure in said one and other flow passages of said other flow passage set acting on the other of said first named pair of areas and the other of said other pair of areas, respectively.

17. The control valve according to claim 10, comprising resilient means engaged between said pair of proportioning means and urging said pair of proportioning means toward positions normally connecting said one and other flow passages of each flow passage set in pressure fluid communication, said pair of proportioning means being initially movable against said resilient means toward positions isolating said one and other flow passages of each flow passage set when the separate fluid pressures therein acting on said pair of proportioning means attain a predetermined value, and said pair of proportioning means being thereafter further movable in response to increases in excess of the predetermined value of the separate fluid pressures in said one flow passage of each flow passage set and assisted by the force of said resilient mean to effect metered increases of the separate fluid pressures in said other flow passages of each flow passage set in a predetermined ratio with the increases of the separate fluid pressures in said one flow passage of each flow passage set in excess of the predetermined value.

18. The control valve according to claim 17, wherein said pair of proportioning means include a pair of pistons, a pair of valve seats on said pair of pistons between said one and other flow passages of each flow passage set, and a pair of valve means on said pair of pistons for engagement with said valve seats, a pair of opposed abutments on said housing, said resilient means being engaged with said pair of pistons normally urging said pair of pistons in opposite directions to engage said pair of valve means with said pair of abutments and disengage said pair of valve seats from said pair of valve means establishing pressure fluid communication between said one and other flow passages of said one and other flow passage sets, respectively, a pair of opposed areas on one of said pistons respectively subjected to the one separate fluid pressure in said one and other flow passages of said one flow passage set, and another pair of opposed areas on the other of said pistons respectively subjected to the other separate fluid pressure in said one and other flow passages of said other flow passage sets, said pair of pistons being initially movable against said resilient means toward positions engaging said pair of valve seats with said pair of valve means and disengaging said pair of valve means from said pair of abutments isolating the one and other flow passages of said one and other flow passage sets when the separate fluid pressures therein respectively acting on said first named and other opposed areas attain a predetermined value and said pair of pistons being thereafter further movable in response to increases in excess of the predetermined value of the separate fluid pressures in said one flow passages of each flow passage set respectively acting on one of said first named pair of means and one of said other pair of areas and assisted by the force of said resilient means toward a metering position reengaging said pair of valve means with said pair of abutment means and again disengaging said pair of valve seats from said pair of piston means to effect metered increases in the magnitudes of the separate fluid pressures in said other flow passages of each flow passage set respectively acting on the other of said first named pair of areas and the other of said other pair of areas in a predetermined ratio with the increases of the magnitudes of the separate fluid pressures in said one flow passage of each flow passage set in excess of the predetermined value.

19. A control valve comprising a housing having a pair of flow passages therein respectively subjected to separate fluid pressures, a pair of proportioning means movable in said housing and defining therewith another pair of flow passages respectively connected in pressure fluid communication with said first named flow passages, said proportioning means being movable in response to the separate fluid pressures in said first named and other flow passages in excess of a predetermined value to alter the magnitudes of the separate fluid pressures in said other flow passages in a predetermined ratio with the magnitudes of the separate fluid pressures in said first named flow passages, a pair of passage means in said housing respectively connected between one of the flow passages of said first named and other pairs of flow passages and between the other of the flow passages of said first named and other pairs of flow passages in by-pass relation with said proportioning means, and other means movable in said housing between said first named and other pairs of flow passages and subjected to the separate fluid pressures therein including a pair of means movable in said passage means and normally interrupting pressure fluid communication therethrough between said one flow passage of said first named and other pairs of flow passages and between the other flow passages of said first named and other pairs of flow passages, respectively, said other means being responsive to one separate fluid pressure in one of said one and other flow passages of said first named and other pairs of flow passages acting thereon to move one of said included means toward a position establishing pressure fluid communication through one of said passage means between said one of said one and other flow passages of said first named and other pairs of flow passages to by-pass one of said proportioning means and obviate actuation thereof upon the failure of the other separate fluid pressure in the other of said one and other flow passages of said first named and other pairs of flow passages also acting on said other means in opposition to the one separate fluid pressure.

20. A control valve comprising a housing having first and second flow passages therein respectively subjected to separate fluid pressures, first and second proportioning means movable in said housing and defining therewith third and fourth flow passages respectively connected in pressure fluid communication with said first and second flow passages, said first and second proportioning means being movable in response to the separate fluid pressures in said first and second flow passages and said third and fourth flow passages in excess of a predetermined value to alter the magnitudes of the separate fluid pressures in said third and fourth flow passages in a predetermined ratio with the magnitudes of the separate fluid pressures in said first and second flow passages, first and second passage means in said housing respectively connected between said first and third flow passages and between said second and fourth flow passages in by-pass relation with said first and second proportioning means, and other means for comparing the magnitudes of the separate fluid pressures in said first and third flow passages and in said second and fourth flow passages and movable in said housing between said first and second flow passages and said third and fourth flow passages from a normal position toward opposed translated positions in response to oppositely directed differentials in excess of a predetermined value between the magniutdes of the separate fluid pressures in said first and third flow passages and in said second and fourth flow passages acting thereon including first and second opposed portions concertedly movable with said other means in said first and second passage means and normally closing said first and second passage means to interrupt pressure fluid communication therethrough between said first and third flow passages and said second and fourth flow passages when said other means is in its normal position, said other means being movable from its normal position toward one of its opposed translated positions when the magnitude of one of the separate fluid pressures in one of said first and third flow passages and said second and fourth flow passages acting thereon exceeds by the predetermined value the magnitude of the other of the separate fluid pressures in the other of said first and third flow passages and said second and fourth flow passages to concertedly move one of said first and second opposed portions toward a position opening one of said first and second passage means to establish pressure fluid communication therethrough between said one of said first and third flow passages and said second and fourth flow passages and thereby by-passing one of said first and second proportioning means to obviate actuation thereof.

21. A control valve comprising a housing, first and second proportioning means movable in said housing and respectively defining therewith opposed first and second fluid pressure chambers and opposed third and fourth fluid pressure chambers, said first and third chambers being selectively subjected to separate fluid pressures, resilient means between said first and second proportioning means and normally urging said first and second proportioning means toward positions connecting said first chamber in pressure fluid communication with said second chamber and connecting said third chamber in pressure fluid communication with said fourth chamber, said first and second proportioning means being initially movable against said resilient means toward positions isolating said first and second chambers and said third and fourth chambers when the separate fluid pressures acting thereon in said first and second chambers and said third and fourth chambers attain a predetermined value and said first and second proportioning means being thereafter further movable in response to increases in excess of the predetermined value of the separate fluid pressures in said first and third chambers and assisted by the force of said resilient means to effect metered increases of the fluid pressures in said second and fourth chambers in a predetermined ratio with the increases of the separate fluid pressures in said first and third chambers in excess of the predetermined value, other means movable in said housing and defining therewith opposed fifth and sixth fluid pressure chambers respectively connected in pressure fluid communication with said first and third chambers, first and second opposed extension means on said other means movable in said housing and defining therewith opposed seventh and eighth chambers respectively connected in pressure fluid communication with said second and fourth chambers, and said first and second extension means also defining with said housing first and second passage means for connection in pressure fluid communication between said fifth and seventh chambers and said sixth and eighth chambers in by-pass relation with said second and fourth chambers, respectively, said other means being responsive to one of the separate fluid pressures in one of said fifth and sixth chambers acting thereon and in one of said seventh and eighth chambers acting on one of said first and second extension means to move said one of said first and second extension means toward a position establishing pressure fluid communication through one of said first and second passage means between one of said fifth and seventh chambers and said sixth and eighth chambers thereby by-passing one of said second and fourth chambers to obviate actuation of one of said first and second proportioning means upon the failure of the other of the separate fluid pressures in the other of said fifth and sixth chambers acting on said other means and in the other of said seventh and eighth chambers acting on the other of said first and second extension means.

22. A control valve comprising a housing having a pair of inlet ports and a pair of sets of outlet ports, one of said inlet ports being connected in pressure fluid communication with one outlet port of one of said outlet port sets and the other inlet port being connected in pressure fluid communication with one outlet port of the other of said outlet port sets, a pair of metering means movable in said housing for controlling pressure fluid communication between said one inlet port and the other outlet port of said one outlet port set and between said other inlet port and the other outlet port of said other outlet port set, said pair of metering means being initially movable in response to fluid pressure of a predetermined value at said one inlet port and other outlet port of said one outlet port set and said other inlet port and other outlet port of said other outlet port set toward isolating positions therebetween and said pair of metering means being thereafter further movable in response to increases in excess of the predetermined value of the fluid pressures at said one and other inlet ports to effect a metered increase in the fluid pressures at said other outlet ports of said one and other outlet port sets in a predetermined ratio with the increased fluid pressure in excess of the predetermined value at said one and other inlet ports, and other means movable in said housing for controlling pressure fluid communication between said one and other outlet ports of said one outlet port set and between said one and other outlet ports of said other outlet port sets, respectively, said other means being movable in response to fluid pressure at the one and other outlet ports of one of said one and other outlet port sets toward a position establishing pressure fluid communication between the one and other outlet ports of said one of said one and other outlet port sets to by-pass one of said pair of metering means and obviate actuation thereof upon the failure of the fluid pressure at the one and other outlet ports of the other of said one and other outlet port sets.

23. A control valve comprising a housing having a pair of sets of outlet ports, means movable in said housing between said port sets for comparing the magnitudes of the fluid pressures at the outlet ports of one of said port sets with the magnitudes of the fluid pressures at the outlet ports of the other of said port sets including a pair of other means controlling pressure fluid communication between the outlet ports of each of said one and other port sets, respectively, said first named means being responsive to the fluid pressures at the outlet ports of one of said one and other port sets acting thereon to move one of said other means toward a translated position establishing pressure fluid communication between the outlet ports of said one of said one and other port sets upon the failure of the fluid pressures at the outlet ports of the other of said one and other port sets, a pair of inlet ports in said housing connected in pressure fluid communication with one of said outlet ports of said one and other port sets, respectively, a pair of proportioning means movable in said housing for controlling pressure fluid communication between said inlet ports and the other of said outlet ports of said one and other port sets, respectively, and resilient means engaged between said proportioning means, said proportioning means being movable against said resilient means in response to fluid pressures at said inlet ports toward positions interrupting pressure fluid communication between said inlet ports and said other outlet ports of said one and other port sets when the fluid pressures at said inlet ports attain a predetermined value and said proportioning means being thereafter further movable in response to increases in the fluid pressures at said inlet ports in excess of the predetermined value and assisted by the force of said resilient means toward other positions etsablishing pressure fluid communication between said inlet ports and said other outlet ports of said one and other port sets to predeterminately increase the fluid pressures at said other outlet ports of said one and other port sets with respect to the increased fluid pressures at said inlet ports, respectively.

24. The control valve according to claim 23, comprising a pair of substantially equal and opposed areas on said first named means respectively subjected to the fluid pressures at the one outlet ports of said one and other outlet port sets, and another pair of substantially equal and opposed areas on said other means subjected to the fluid pressures at the other outlet port of said one and other outlet port sets, respectively.

25. The control valve according to claim 23, wherein said other means define with said housing a pair of by-pass passage means between the outlet ports of said one and other port sets, respectively, one of said by-pass passage means being opened upon the movement of said one other means toward its translated position establishing the pressure fluid communication between the outlet ports of said one of said one and other port sets to by-pass one of said proportioning members and obviate actuation thereof.

26. The control valve according to claim 25, comprising a pair of sealing means on said other means normally in sealing engagement with said by-pass passage means to interrupt pressure fluid communication between the outlet ports of said one and other port sets, respectively, one of said sealing means being disengaged from said one by-pass passage means upon the movement of said one other means toward its translated position.

27. The control valve according to claim 25, comprising a pair of sealing means disposed in said by-pass passage means for sealing engagement with said other means to interrupt pressure fluid communication through said by-pass passage means between the outlet ports of said one and other port sets, and a pair of reduced portions on said other means for movement through said sealing means to open said by-pass passage means and establish pressure fluid communication between the outlet ports of said one and other port sets, respectively.

28. The control valve according to claim 25, wherein said first named means includes piston means movable in said housing and having a pair of opposed end portions, a pair of opposed substantially equal areas defined on said end portions respectively subjected to the fluid pressures at said one outlet ports of said one and other port sets, said other means including a pair of opposed extension means connected with said end portions and extending into said by-pass passage means, another pair of opposed end portions on said extension means movable in said by-pass passage means in sealing engagement therewith and normally interrupting pressure fluid communication through said by-pass passage means between the outlet ports of said one and other port sets, another pair of opposed substantially equal areas defined on said other end portions respectively subjected to the fluid pressures at the other outlet ports of said one and other port sets, the fluid pressures at the one and other outlet ports of one of said one and other ports sets acting on one of said first named areas and one of said other areas to move said piston means and extension means in a direction to sealably disengage one of said other end portions from said one by-pass passage means establishing the pressure fluid communication therethrough between the one and other outlet ports of said one of said one and other port sets upon the failure of the fluid pressures at the one and other outlet ports of the other of said one and other port sets acting on the other of said first named areas and the other of said other areas, respectively.

29. The control valve according to claim 23, wherein said proportioning means include a pair of opposed piston means, a pair of passages in said piston means respectively connected between said inlet ports and the other outlet ports of said one and other port sets, a pair of valve seats on said piston means about said passages, a pair of valve means movable in said piston means for engagement with said valve seats, a pair of opposed abutments on said housing, said resilient means including a spring having opposed end portions in force transmitting engagement with said piston means urging said piston means in opposite directions to engage said valve means with said abutments and disengage said valve means from said valve seats establishing pressure fluid communication between said inlet ports and the other outlet ports of said one and other port sets, respectively, a pair of opposed areas on one of said pistons respectively subjected to the fluid pressures at one of said inlet ports and the other outlet port of said one of said one and other port sets, and another pair of opposed areas on the other of said pistons respectively subjected to the fluid pressures at the other of said inlet ports and the other outlet port of the other of said one and other port sets, said pistons being initially movable against the force of said spring toward positions engaging said valve seats with said valve means to close said passages when the fluid pressures at said one inlet port and the other outlet port of said one of said one and other port sets respectively acting on one and the other areas of said first named area pairs and at said other inlet port and the other outlet port of said other of said one and other port sets respectively acting on said one and the other areas of said other area pairs attain a predetermined value, and said piston means being thereafter further movable in response to increases in excess of the predetermined value of the fluid pressures at said one and other inlet ports respectively acting on said one area of said first named and other area pairs and assisted by the force of said spring toward a metering position disengaging said valve seats from said valve means to open said passages and effect metered increases in the magnitudes of the fluid pressures at the other outlet ports of said one and other port sets respectively acting on said other area of said first named and other area pairs in a predetermined ratio with the increases in the magnitudes of the fluid pressures at said one and other inlet ports in excess of the predetermined value.

30. A control valve comprising a housing having a pair of sets of ports therein for respective subjection to separate fluid pressures, each of said port sets including inlet and outlet ports, a pair of proportioning members respectively movable in said housing for controlling pressure fluid communication between said inlet and outlet ports of said port sets, and resilient means contained between said proportioning members, said proportioning members being initially movable against said resilient means in response to established separate fluid pressures of a predetermined value at said inlet and outlet ports of said port sets toward positions interrupting pressure fluid communication between said inlet and outlet ports of said port sets and said proportioning members also being thereafter further movable in response to increases in the separate fluid pressures at said inlet ports of said port sets in excess of the predetermined value and assisted by the force of said resilient means toward other positions establishing pressure fluid communication between said inlet and outlet ports of said port sets to predeterminately increase the separate fluid pressures in excess of the predetermined value at said outlet ports of said port sets with respect to the increased fluid pressures at said inlet ports of said port sets, respectively.

31. The control valve according to claim 30, comprising a pair of sets of opposed differential areas on said proportioning members, respectively, said proportioning members being movable against the force of said resilient means toward their first named positions in response to the established separate fluid pressures at said inlet and outlet ports of said port sets respectively acting on one and the other of said differential areas of said area sets, and said proportioning members being thereafter further movable in response to the increased separate fluid pressures in excess of the predetermined value at said inlet port of said port sets acting on said one differential area of said area sets and and assisted by the force of said resilient means toward their other positions effecting the predetermined increase in the separate fluid pressures in excess of the predetermined value at the outlet ports of said port sets acting on said other differential areas of said area sets, respectively.

32. The control valve according to claim 31, wherein said other differental areas of said area sets are substantially equal and greater than said one differential area of said area sets, said one differential area of said area sets also being substantially equal.

33. The control valve according to claim 31, comprising a pair of abutment means on said housing, said proportioning members including a pair of pistons slidable in said housing, a pair of passage means in said pistons respectively connected between the inlet and outlet ports of said port sets, a pair of valve seats on said pistons about said passage means, a pair of valve means movable in said pistons for engagement with said abutment means and said valve seats, said pair of sets of opposed differential areas being on said pistons, said resilient means including a spring having opposed ends in force transmitting engagement with said pistons and urging said pistons toward normal positions to engage said valve means with said abutment means and disengage said valve means from said valve seat opening said passage means, said pistons being initially movable against the force of said spring in response to the separate fluid pressures of the predetermined value at the inlet and outlet ports of said port sets acting on said one and other differential areas of said area sets toward their first named positions to engage said valve seats with said valve means and close said passage menas, and said pistons being thereafter further movable in response to the increased separate fluid pressures at said inlet ports of said port sets acting on said one differential area of said area sets and assisted by the force of said spring toward their other positions to disengage said valve seats from said valve means and opening said passage means to effect the predetermined increase in the separate fluid pressures in excess of the predetermined value at the outlet ports of said port sets acting on said other differential areas of said area sets, respectively.

34. A control valve comprising a housing, a pair of opposed proportioning members respectively movable in said housing for controlling separate applications through said housing of separate fluid pressures supplied thereto, and resilient means contained in force transmitting engagement between said proportioning members and normally urging said proportioning members toward positions to effect the applications through said housing of the supplied fluid pressures, said proportioning members being initially movable against the force of said resilient means in response to applied and supplied fluid pressures of a predetermined value toward positions isolating the supplied fluid pressures from the applied fluid pressures and being thereafter further movable in response to increases in the supplied fluid pressures in excess of the predetermined value and assisted by the force of said resilient means towards metering positions establishing metered pressure fluid communication between the supplied and applied fluid pressures to effect metered increases in the applied fluid pressures in a predetermined ratio with the increased supplied fluid pressures in excess of the predetermined value, respectively.

35. The control valve according to claim 34, comprising first and second pairs of opposed areas on said proportioning members, said proportioning members being movable against the force of said resilient means toward their isolating positions in response to the supplied and applied fluid pressures of the predetermined value respectively acting on said first and second pairs of areas and said proportioning members being thereafter further movable in response to the increased supplied fluid pressures in excess of the predetermined value acting on one of the areas of each of said first and second pairs of areas assisted by the force of said resilient means toward their metering positions effecting the metered increase in the applied fluid pressures acting on the other of the areas of each of said first and second pairs of areas in the predetermined ratio, respectively.

36. The control valve according to claim 35, wherein said other areas of each of said first and second pairs of areas are substantially equal and greater than said one area of each of said first and second pairs of areas, said one area of each of said first and second pairs of areas also being substantially equal.

37. The control valve according to claim 34, comprising a pair of separate flow passages in said housing for the applications therethrough of the supplied fluid pressures, said proportioning members defining with said housing said flow passages.

38. The control valve according to claim 37, wherein said proportioning members comprise a pair of pistons movable in said housing, a pair of passage means in said pistons defining portions of said flow passages, a pair of valve seats on said pistons about said passage means, a pair of valve means movable in said piston for engagement with said valve seats, abutment means on said housing for engagement with said valve means, said resilient means normally urging said pistons toward their normal positions to engage said valve means with said abutment means and disengage said valve means from said valve seats to permit the applications through said flow passage of the supplied fluid pressure less than the predetermined value, said piston means being initially movable against the force of said resilient means in response to the applied and supplied fluid pressures toward their isolating positions to engage said valve seats with said valve means closing said passage means, and said pistons being thereafter further movable in response to the increased supplied fluid pressure in excess of the predetermined value and assisted by the force of said resilient means toward their metering positions disengaging said valve seats from said valve means to open said passage means and effect the metered increase of the applied fluid pressures in the predetermined ratio, respectively.

39. The control valve according to claim 38, comprising a pair of opposed differential areas on said pistons, respectively, said pistons being initially movable against resilient means toward their isolating positions in response to the supplied and applied fluid pressures of the predetermined value acting on said opposed differential areas of said pistons, and said pistons being thereafter further movable in response to the increased supplied fluid pressures in excess of the predetermined value acting on one of the areas of each of said pair of differential areas and assisted by the force of said resilient means toward their metering positions effecting the metered increase in the applied fluid pressures in the predetermined ratio acting on the other of the areas of each of said pair of differential areas.

40. The control valve according to claim 39, wherein said other areas of each of said pair of differential areas are substantially equal and greater than said one area of each of said pair of differential areas, said one area of each of said pair of differential areas also being substantially equal.

References Cited

UNITED STATES PATENTS

| 2,195,214 | 3/1940 | Jacob | 303—84 |
| 2,593,185 | 4/1952 | Renick | 137—101 |
| 2,811,979 | 11/1957 | Presnell | 303—84 XR |
| 3,358,097 | 12/1967 | Kersting | 200—82 |

MILTON BUCHLER, *Primary Examiner.*

J. J. McLAUGHLIN, JR., *Assistant Examiner.*

U.S. Cl. X.R.

60—54.5; 137—87; 188—151, 152; 200—82; 303—84

UNITED STATES PATENT OFFICE

CERTIFICATE OF CORRECTION

Patent No. 3,450,443  Issued June 17, 1969

Richard C. Bueler

It is certified that error appears in the above-identified patent and that said Letters Patent are hereby corrected as shown below:

Column 5, line 6, "$A_8$" should read -- $A_6$ --; line 68, after "$P_2 A_7$" insert -- , $P_2 A_8$ --. Column 7, line 45, "$P_{R2}$" should read -- $P_{2R}$ --. Column 8, line 10, after "is" insert -- , --; line 34, "as" should read -- has --. Column 14, line 3, "pressure" should read -- pressures --. Column 15, line 54, "passage" should read -- passages --; line 57, "passage" should read -- passages --. Column 16, line 13, "passage" should read -- passages --; line 26, "up" should read -- upon --; line 44, "passage", first occurrence, should read -- passages --; line 49, "passage" should read -- passages --. Column 17, line 7, "means" should read -- areas --; line 18, "passage" should read -- passages --. Column 18, line 9, "magniutdes" should read -- magnitudes --. Column 20, line 12, "etsablishing" should read -- establishing --. Column 22, line 15, "area" should read -- areas --; line 24, "area" should read -- areas --; line 25, "area", second occurrence, should read -- areas --. Column 23, line 25, "area" should read -- areas --; line 26, "area" should read -- areas --. Column 24, line 29, "area" should read -- areas --; line 30, "area" should read -- areas --.

Signed and sealed this 24th day of March, 1970.

(SEAL)
Attest:

Edward M. Fletcher, Jr.
Attesting Officer

WILLIAM E. SCHUYLER, JR.
Commissioner of Patents